United States Patent
Cleveland

(10) Patent No.: US 8,379,755 B2
(45) Date of Patent: *Feb. 19, 2013

(54) RF TRANSMITTER WITH ADAPTIVE DIGITAL FILTERING

(75) Inventor: Joseph R. Cleveland, Murphy, TX (US)

(73) Assignee: Samsung Electronics Co., Ltd., Suwon-Si (KR)

(*) Notice: Subject to any disclaimer, the term of this patent is extended or adjusted under 35 U.S.C. 154(b) by 676 days.

This patent is subject to a terminal disclaimer.

(21) Appl. No.: 11/590,398

(22) Filed: Oct. 31, 2006

(65) Prior Publication Data

US 2007/0258542 A1    Nov. 8, 2007

Related U.S. Application Data

(60) Provisional application No. 60/798,257, filed on May 5, 2006.

(51) Int. Cl.
H04L 27/00 (2006.01)

(52) U.S. Cl. .................. 375/295; 375/232

(58) Field of Classification Search .......... 375/295, 375/284, 285, 232, 350
See application file for complete search history.

(56) References Cited

U.S. PATENT DOCUMENTS

| | | | |
|---|---|---|---|
| 6,285,709 B1* | 9/2001 | Alelyunas et al. | 375/233 |
| 6,308,190 B1* | 10/2001 | Willson et al. | 708/319 |
| 6,430,228 B1* | 8/2002 | Zhang | 375/261 |
| 6,650,756 B1* | 11/2003 | Saito et al. | 381/71.12 |
| 7,167,517 B2* | 1/2007 | Farjad-Rad et al. | 375/232 |
| 7,552,158 B2* | 6/2009 | Kim | 708/322 |
| 2002/0032571 A1* | 3/2002 | Leung et al. | 704/503 |
| 2003/0016761 A1* | 1/2003 | Min | 375/298 |
| 2004/0059764 A1* | 3/2004 | Takeda | 708/313 |
| 2005/0215204 A1* | 9/2005 | Wallace et al. | 455/78 |
| 2006/0053187 A1* | 3/2006 | Wagner | 708/300 |
| 2006/0198477 A1* | 9/2006 | Moorti et al. | 375/347 |
| 2006/0269025 A1* | 11/2006 | Toyoda | 375/350 |
| 2007/0230593 A1* | 10/2007 | Eliaz et al. | 375/260 |
| 2007/0258544 A1* | 11/2007 | Cleveland et al. | 375/299 |
| 2009/0252213 A1* | 10/2009 | Zerbe et al. | 375/231 |
| 2011/0096824 A1* | 4/2011 | Agazzi et al. | 375/233 |

* cited by examiner

*Primary Examiner* — Emmanuel Bayard

(57) ABSTRACT

An RF transmitter filter for use in a wireless communication system is disclosed. The filter includes a waveform detector to detect a power level of a transmitted data stream on a symbol-by-symbol basis. The filter also includes a processor to select a combination of filter parameter values according to the power level. The RF transmitter filter selects and adjusts filter parameters (i.e., number of taps or filter length, word length, coefficient quantization, sampling rate, tap delay, sampling bits, etc.) based on signal waveform characteristics. The adjustments limit the transmitted bandwidth and allow transmitted signals to meet an emission mask, while still enabling a receiver to recover the correct sample values of transmitted symbols. The filter further includes a reconfigurable digital filter to filter the transmitted data stream according to the combination of filter parameters.

21 Claims, 5 Drawing Sheets

RF TRANSMITTER WITH ADAPTIVE DIGITAL FILTERING

CROSS-REFERENCE TO RELATED APPLICATION AND CLAIM OF PRIORITY

The present application is related to U.S. Provisional Patent No. 60/798,257, filed May 5, 2006, entitled "RF TRANSMITTER WITH ADAPTIVE DIGITAL FILTERING THAT REDUCES SIGNAL PROCESSING REQUIREMENTS". U.S. Provisional Patent No. 60/798,257 is assigned to the assignee of the present application and is hereby incorporated by reference into the present disclosure as if fully set forth herein. The present application hereby claims priority under 35 U.S.C. §119(e) to U.S. Provisional Patent No. 60/798,257.

TECHNICAL FIELD OF THE INVENTION

The present application relates generally to wireless communication networks and, more specifically, to radio frequency (RF) transmitter systems.

BACKGROUND OF THE INVENTION

Modern communications demand higher signaling rates and performance. Radio frequency (RF) transmitters typically employ fixed pulse-shaping filters such as, for example, raised root cosine (RRC) or finite impulse response (FIR) filters. Such filters are designed to meet the emission mask and enable a receiver to recover the correct sample values of transmitted symbols. These filters, however, are not optimized for a combination of particular signal waveforms, emission constraints, noise, adjacent channel interference and anticipated propagation channel conditions.

There is therefore a need for efficient RF transmitter filters. More particularly, there is a need for reconfigurable digital filters for RF transmitters that reduce processing power and power dissipation.

SUMMARY OF THE INVENTION

The present disclosure provides a technique for adaptive digital filtering to reduce signal processing requirements.

In one embodiment, a method for providing adaptive digital filtering for use in an RF transmitter is disclosed. The method includes detecting a power level of a signal on a symbol-by-symbol basis. The method also includes selecting a combination of filter parameter values according to the power level. The method further includes filtering the signal according to the combination of filter parameters.

In another embodiment, an RF transmitter filter for use in a wireless communication system is disclosed. The filter includes a module to detect a power level of a signal on a symbol-by-symbol basis. The filter also includes a processor to select a combination of filter parameter values according to the power level. The filter further includes a digital filter reconfigurable according to the combination of filter parameters.

In still another embodiment, an RF transmitter filter for use in a wireless communication system is disclosed. The filter includes a waveform detector to detect a power level of a transmitted data stream on a symbol-by-symbol basis. The filter also includes a processor to select a combination of filter parameter values according to the power level. The filter further includes a reconfigurable digital filter to filter the transmitted data stream according to the combination of filter parameters.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Conventional RF transmitters typically include a pulse-shaping filter (not shown) to: (1) limit the transmitted bandwidth so that the transmitted signal meets an emission mask; and (2) enable a receiver to recover the correct sample values of transmitted symbols. The pulse-shaping filter may be any suitable filter such as, for example, a raised root cosine (RRC) or finite impulse response (FIR) filter.

Conventional digital filters used in RF transmitters typically include multiple taps. For wide-band code division multiple access (WCDMA) signals, the digital filter may be a 20-tap filter with a 16-bit input for each of I and Q (16-bit complex) and have a sampling rate twice the chip rate (e.g., 7.68 Msps). This configuration requires approximately 3600 MIPS for the 384 kbps Universal Mobile Telecommunications Service (UMTS) channel. The amount of processing required is based on the product of the number of taps (filter length), the word length (bits per sample), and coefficient length. Higher symbol rates require proportionately greater processing power and thereby more power consumption and heat generation.

Figure 1:
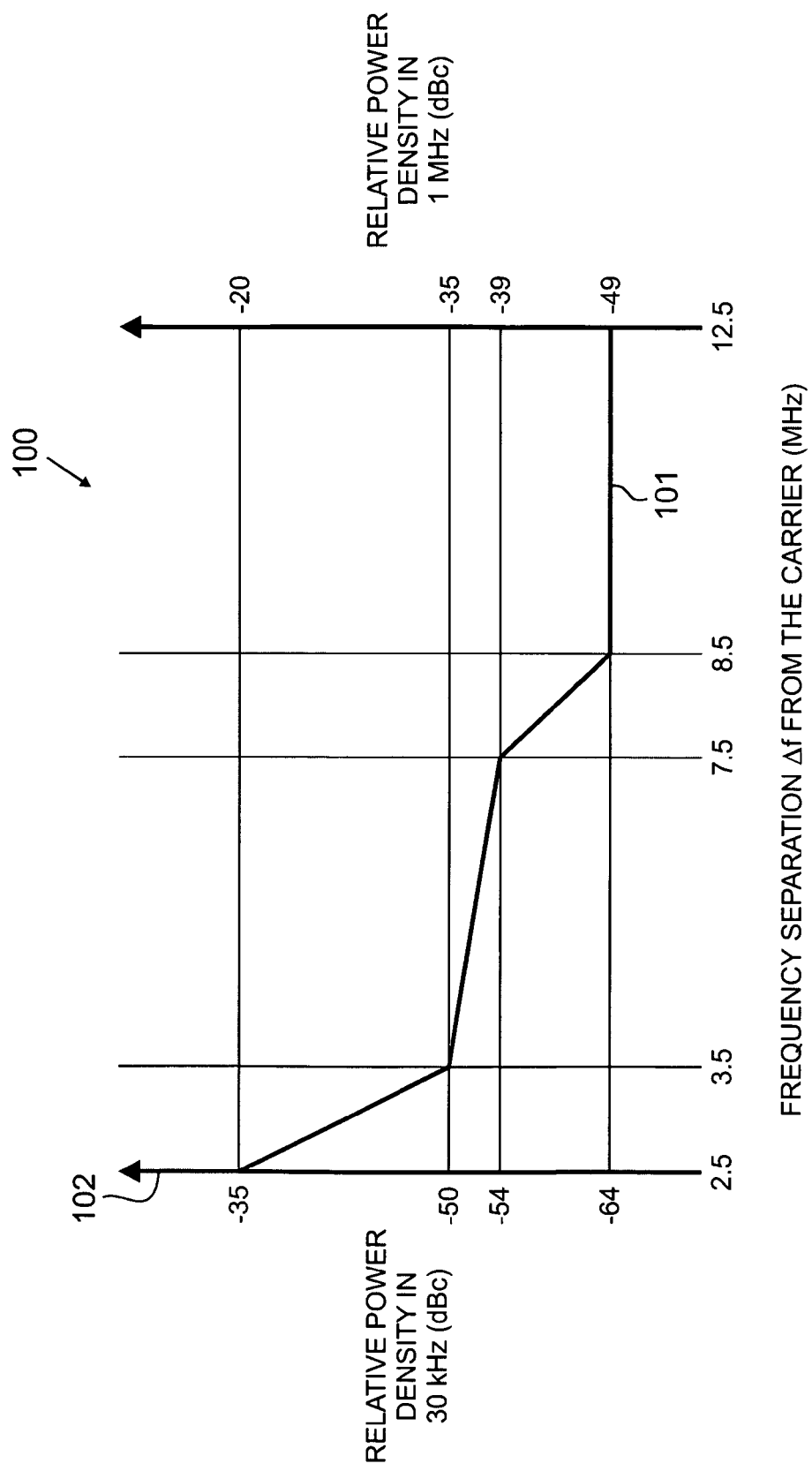
FIG. 1 a spectrum emission mask for a mobile terminal in a 5 MHz channel.

FIG. 1 illustrates spectrum emission mask 100 required by, for example, UMTS for a mobile terminal or mobile station (MS) in a 5 MHz channel for WCDMA or high-speed downlink packet access (HSDPA) signals. Emission mask 100 identifies the maximum allowed power of spurious and noise signals in the spectrum outside the authorized transmission channel. For example, emission mask 100 illustrates that as the relative change in frequency separation from the carrier 101 (the x-axis) increases, the relative power density 102 (the y-axes) decreases.

Figure 2:
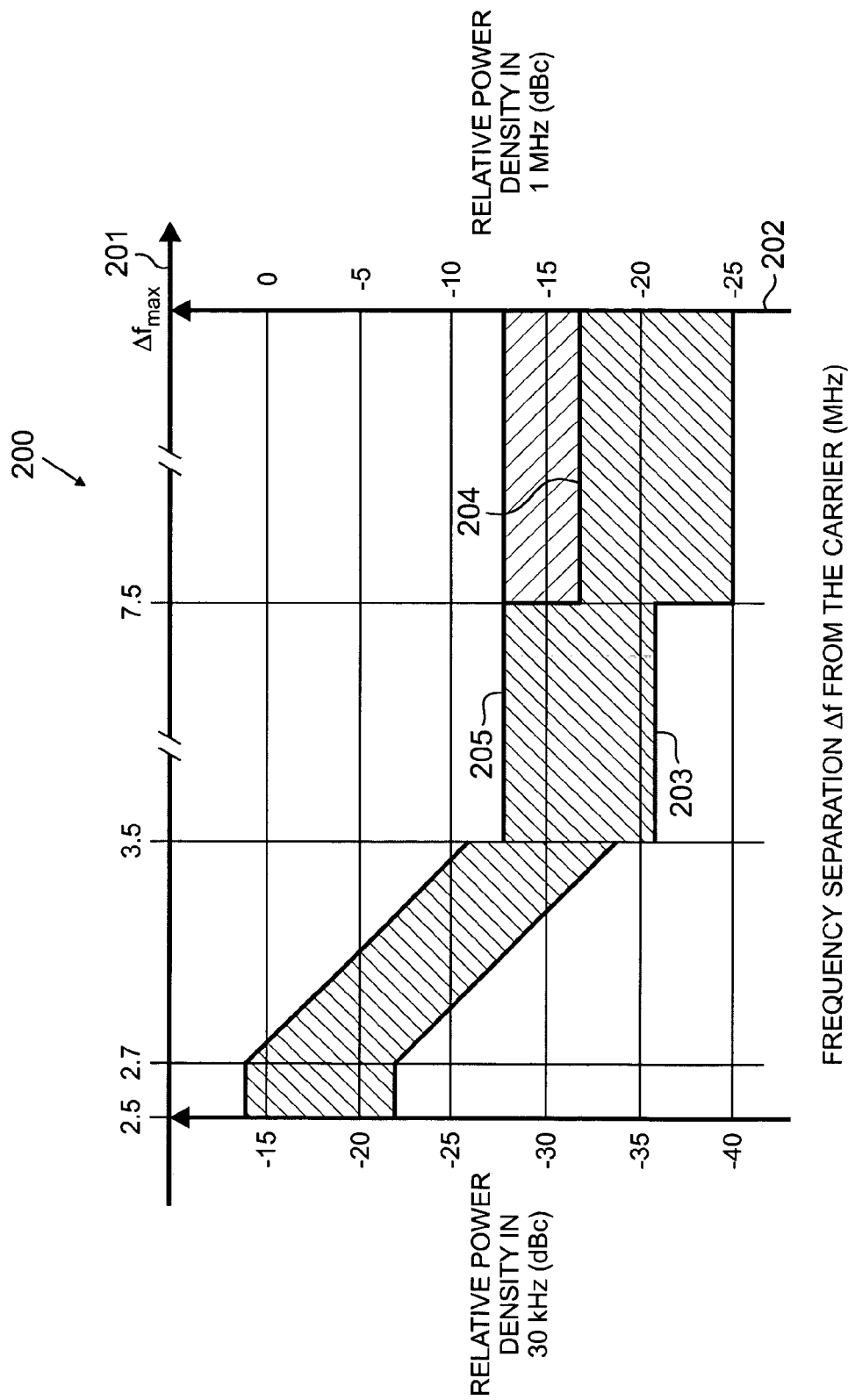
FIG. 2 illustrates a spectrum emission mask for a base transceiver system in a 5 MHz channel.

FIG. 2 illustrates spectrum emission mask 200 required by, for example, UMTS for a base transceiver system (BTS) in a 5 MHz channel for signals in, for example, WCDMA or HSDPA. Spectrum emission mask 200 illustrates that as the relative change in frequency separation from the carrier 201 (the x-axis) increases, the relative power density 202 (the y-axis) decreases. In addition, emission mask 200 identifies the maximum allowed power of spurious and noise signals in the spectrum outside the authorized transmission channel. The different transmit power levels 203, 204 and 205 highlighted in FIG. 2 correspond to different BTS classes or types.

Base stations and mobile stations adapt the transmit power to maintain a set signal-to-noise ratio (SNR) level at the respective receivers to mitigate any near-far problems. As a result, the nominal power level for base stations and mobile stations is often well below the designated maximum power levels referenced in FIGS. 1 and 2. Furthermore, for signals with a low crest factor in a modulation symbol burst, such as for CDMA, WCDMA or OFDM waveforms, the power level of the burst is well below the designated maximum power levels referenced in FIGS. 1 and 2. Hence, the filtering requirements for out-of-band emissions can be relaxed and the output emissions still meet the required mask.

Figure 3:
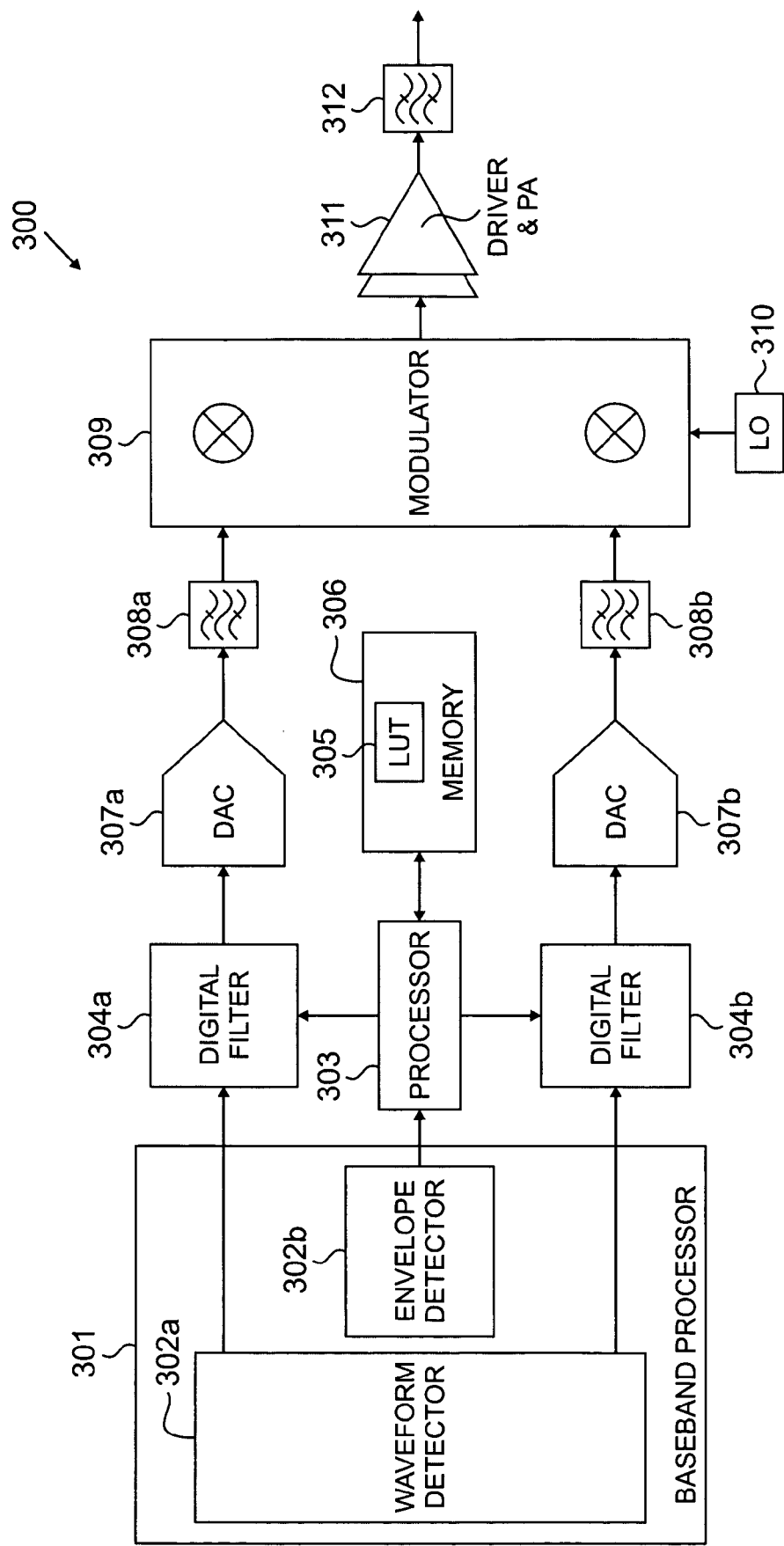
FIG. 3 illustrates an adaptive pulse-shaping filter according to one embodiment of the present disclosure.

FIG. 3 illustrates the reconfigurable architecture of adaptive filter 300 for use in an RF transmitter according to one embodiment of the present disclosure. Adaptive filter 300 reduces processing power and the power dissipation dependency on the signal crest factor (e.g., a waveform). Adaptive filter 300 also reduces the requirements of the emission mask of a transmitted waveform and limits inter-symbol interference (ISI). Adaptive filter 300 may be used in any suitable wireless network such as, for example, systems employing vector modulation such as GSM, CDMA, WCDMA, OFDM, OFDMA technologies, or the like.

According to one embodiment of the present disclosure, adaptive filter 300 adjusts filter parameters (i.e., number of taps or filter length, word length, coefficient quantization, sampling rate, tap delay, sampling bits, etc.) based on signal waveform characteristics. The adaptive adjustments limit the transmitted bandwidth and allow transmitted signals to meet an emission mask, while still enabling a receiver to recover the correct sample values of transmitted symbols.

Adaptive filter 300 includes baseband processor 301 and waveform detector 302a. Waveform detector 302a detects the power level of the transmitted signal on a symbol-by-symbol basis. Baseband processor 301 and waveform detector 302a may be embedded in a modem or may be implemented as a separate, external function in a field programmable gate array (FPGA) or application-specific integrated circuit (ASIC). Baseband processor 301 may be any suitable processor in accordance with the present disclosure. Similarly, waveform detector 302a may be any suitable detector in accordance with the present disclosure.

Processor 303 uses an output of envelope detector 302b to set parameters of digital filters 304a and 304b to, for example, minimize the number of instructions per second and the amount of power required by adaptive filter 300 (and in particular digital filters 304a and 304b) to perform. Processor 303 uses an algorithm or a lookup table 305 stored in memory 306 to select the combination of filter parameters (such as the number of taps (filter length), the word length (bits per sample), tap delay and coefficient length). Processor 303 may use any suitable algorithm to select the combination of filter parameters in accordance with the present disclosure. Processor 303 may be any suitable processor in accordance with the present disclosure.

In one embodiment according to the present disclosure, the filter parameters are chosen to minimize the number of instructions per second. In addition, the chosen parameter values should keep the amount of power used consistent while minimizing the ISI for the waveform being transmitted. Processor 303 may also select a combination of filter parameters to achieve a desired efficiency or as is required. For example, processor 303 may set the delay parameters and the tap coefficients and accordingly send a processor control signal to digital filters 304a and 304b to achieve the desired requirements.

After waveform detector 302a outputs the I- and Q-data streams, each stream is passed to its respective digital filters 304a and 304b. Digital filters 304a and 304b process the I- and Q-data streams according to the processor control signals received from processor 303. For example, digital filters 304a and 304b adaptively adjust the filter parameters, based on the signal waveform characteristics previously ascertained and accounted for by processor 303. Digital filters 304a and 304b may use any suitable programmable filter architecture.

After passing through digital filters 304a and 304b, the data streams are passed though digital-to-analog converters (DAC) 307a and 307b, the data streams are recombined and modulated using modulator 309 and local oscillator (LO) 310. The recombined data stream is passed through a two-stage driver and power amplifier (Driver/PA) 311. Finally, the output of Driver/PA 311 is passed through baseband filter 312.

In one embodiment, the size of digital filters 304a and 304a provide enough processing to meet average filter requirements known conventionally plus a predefined margin. Thus, adaptive filter 300 preferably meets all requirements for the streams within a set percentage of the time. In one embodiment, the complexity of digital filters 304a and 304b and thus adaptive filter 300 may be reduced by recognizing that each modulation stream has a different coding, thus the crest factor of each transmitted modulation symbol will be distinct.

Figure 4:
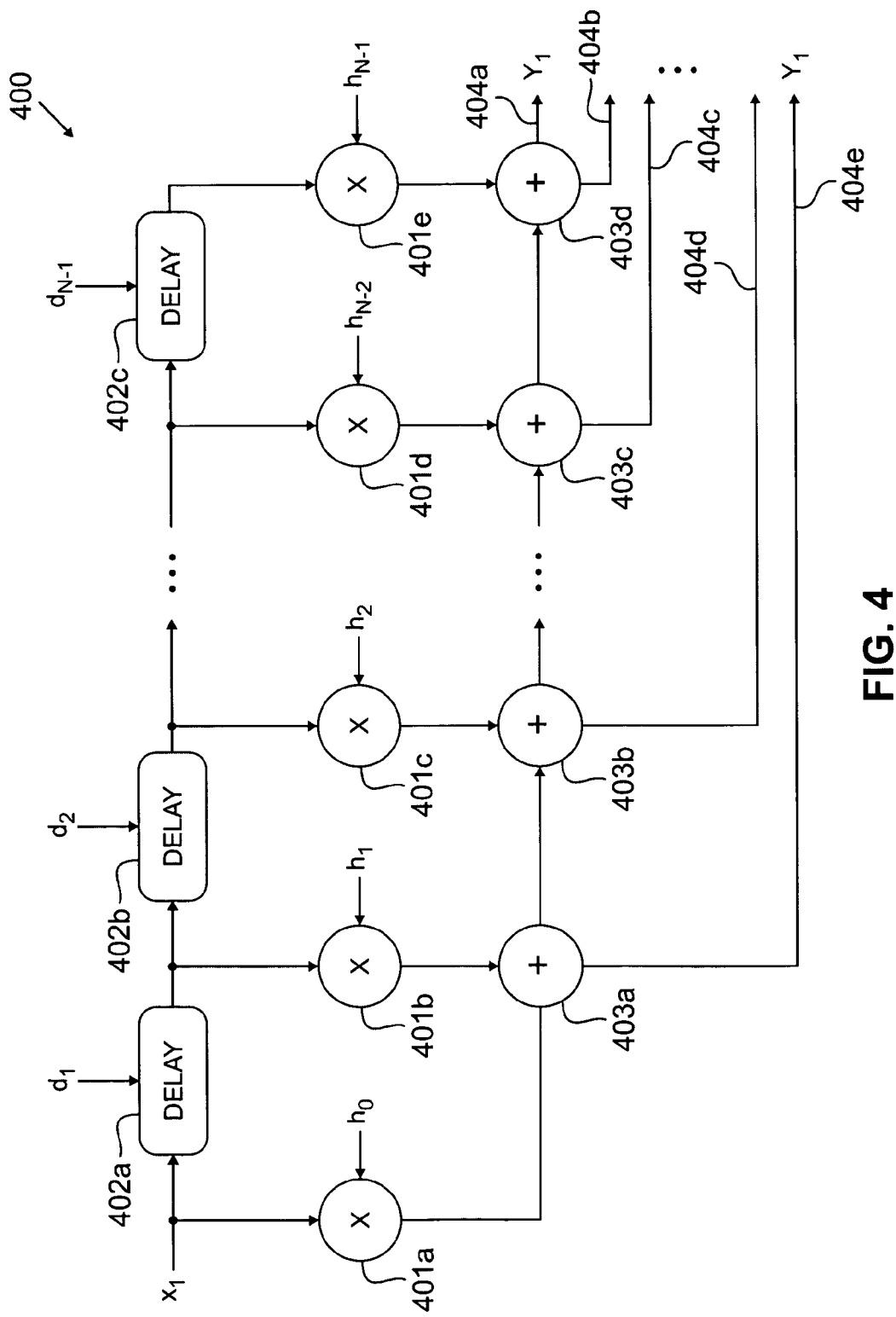
FIG. 4 illustrates a FIR filter according to one embodiment of the present disclosure.

FIG. 4 illustrates FIR filter 400 in accordance with one embodiment of the present disclosure. FIR filter 400 includes tap coefficient set $\{h_0, h_1, \ldots, h_{N-1}\}$ 401a, 401b, 401c, 401d and 401e (collectively referred to herein as tap coefficient set 401). Although only five tap coefficient sets 401 are shown in FIG. 4, any suitable number of tap coefficient sets 401 may be used in accordance with the present disclosure. FIR filter 400 also includes a delay set $\{d_1, \ldots, d_{N-1}\}$ 402a, 402b and 402c (collectively referred to herein as delay set 402). Although only three delay sets 402 are shown in FIG. 4, any suitable number of delay sets may be used in accordance with the present disclosure.

FIR filter 400 further includes tap output set {$y_1, \ldots, y_{N-1}$} 403a and 403b (collectively referred to herein as tap output set 403). Although four tap output sets 403 are shown in FIG. 4, any suitable number of tap output sets 403 may be used. As described earlier, processor 303 sets the delay parameters and the tap coefficients and accordingly produces a processor control signal 306a accordingly. In one embodiment, the number of taps used is determined by the selection of the respective output port 404a, 404b, 404c, 404d and 404e (collectively referred to herein as output port 404) from tap output set {Y} 403. Although four output ports 404 are shown in FIG. 4, any suitable number of output ports may be used.

Figure 5:
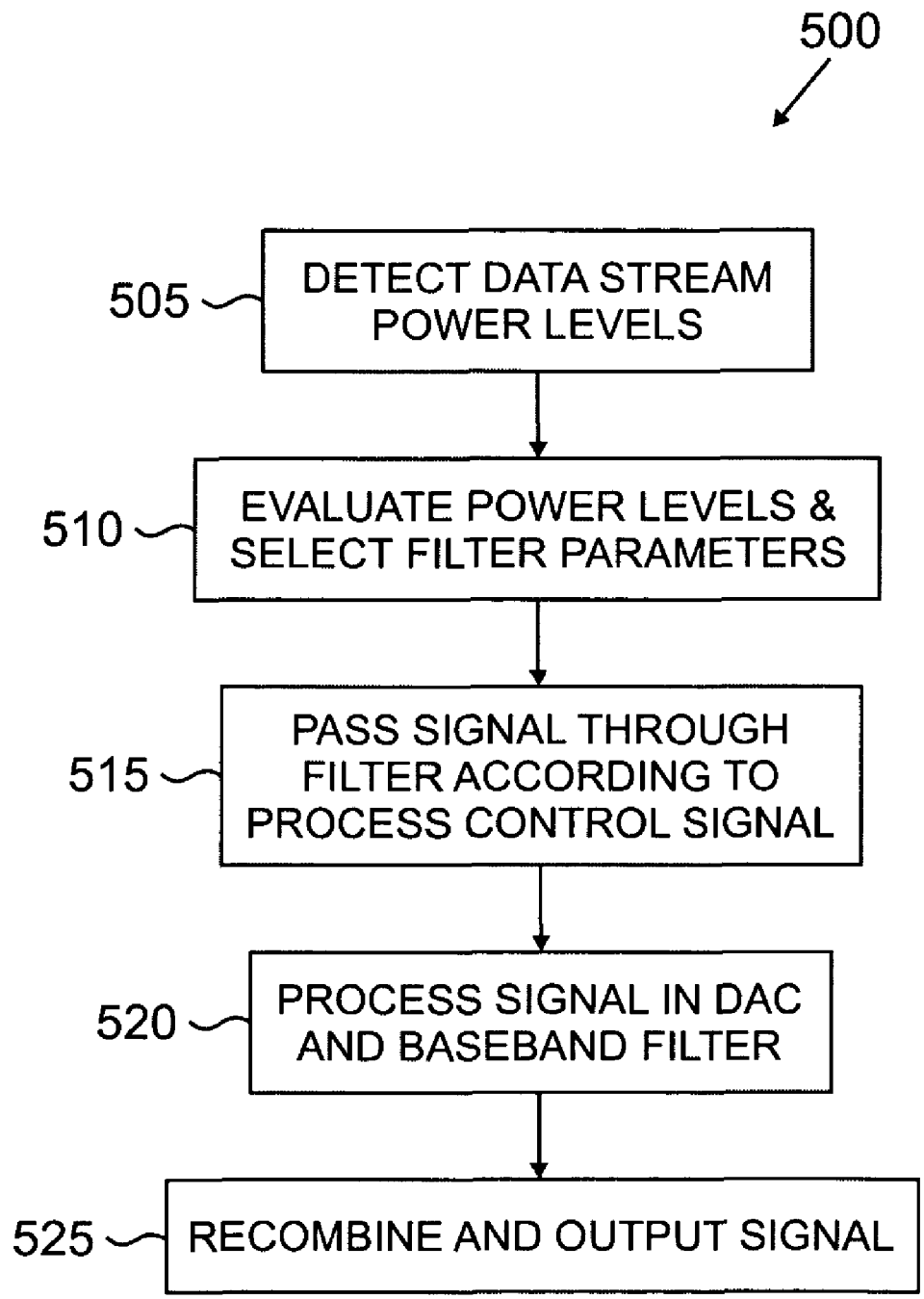
FIG. 5 is a somewhat simplified flow chart illustrating a method for filtering the transmitter of an RF system in accordance with one embodiment of the present disclosure.

FIG. 5 is a somewhat simplified flow chart illustrating method 500 for adaptively filtering signals in an RF transmitter. In step 505, a waveform detector, such as waveform detector 302a, detects the power level of a transmitted data stream on a symbol-by-symbol basis.

In step 510, a processor, such as processor 303, evaluates the respective power levels and data streams based on the output of envelope detector 302b. Processor 303 generates a process control signal that aids in selecting the various process control or filter parameters according to predetermined criteria such as, for example, inter-symbol interference, power consumption and the number of instructions performed by adaptive filter 300. The predetermined criteria may be referenced from a lookup table, such as lookup table 305 stored in memory 306. The predetermined criteria may be met by selecting a combination of parameters such as, for example, a number of taps, a filter length, a word length, a coefficient quantization, a sampling rate, bits per sample, a sampling bit, a tap delay and a coefficient length.

In step 515, processor 303 sends a process control signal to reconfigurable digital filters, such as digital filters 304a and 304b. Digital filters 304a and 304b process the data streams according to the process control signal. In step 520, the processed signals are passed on to digital-to-analog converters, such as DAC 307a and 307b, and passed through a baseband filter, such as baseband filters 308a and 308b. The data streams are then recombined and modulated using a modulator, such as modulator 309, and a local oscillator, such as LO 310, in step 525. The recombined signal is finally output to a two-stage driver and power amplifier, such as Driver/PA 311, and passed through a baseband filter, such as baseband filter 312, in step 530.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in an RF transmitter, a method for providing adaptive digital filtering, comprising:
   detecting, at a waveform detector, a power level of a signal on a symbol-by-symbol basis;
   selecting, at a processor, from a lookup table coupled to the processor, a combination of filter parameter values according to the power level; and
   filtering, at a digital filter, the signal according to the combination of filter parameter values, wherein selecting the combination of filter parameter values minimizes the number of instructions performed by the digital filter, minimizes a power consumption of the digital filter, and allows the filtered signal to meet a spectrum emission mask of the RF transmitter, the spectrum emission mask identifying a maximum allowed power of spurious and noise signals in the spectrum outside an authorized transmission channel, the spectrum emission mask comprising a plurality of transmit power levels, each transmit power level corresponding to a different base transceiver system (BTS) type.

2. The method of claim 1, wherein selecting the combination of filter parameter values minimizes inter-symbol interference.

3. The method of claim 1, wherein the digital filter separately filters I and Q data streams.

4. The method of claim 1, wherein the digital filter comprises a plurality of tap coefficients, a series of tap outputs, and a series of tap output ports, each output port associated with a tap output, wherein each tap output after a first tap output in the series is determined by delaying an input signal, then multiplying the delayed input signal by a tap coefficient to obtain a result, then adding the result to the previous tap output in the series, and wherein the output port used by the filter is deter mined by at least one of the filter parameter values.

5. The method of claim 1, wherein the RF transmitter comprises a wide-band code division multiple access (WCDMA) transmitter.

6. The method of claim 1, wherein the filter parameter values are at least one of: a filter length, a coefficient quantization, a sampling rate, bits per sample, a sampling bit, a tap delay, a tap coefficient and a coefficient length.

7. The method of claim 1, wherein the filter parameter values comprise a word length.

8. For use in a wireless communication system, an RF transmitter filter comprising:
   a module configured to detect a power level of a signal on a symbol-by-symbol basis;
   a processor configured to select, from a lookup table coupled to the processor, a combination of filter parameter values according to the power level; and
   a digital filter reconfigurable according to the combination of filter parameter values, wherein the combination of filter parameter values minimizes the number of instructions performed by the digital filter, minimizes a power consumption of the digital filter, and allows the filtered signal to meet a spectrum emission mask of the RF transmitter, the spectrum emission mask identifying a maximum allowed power of spurious and noise signals in the spectrum outside an authorized transmission channel, the spectrum emission mask comprising a plurality of transmit power levels, each transmit power level corresponding to a different base transceiver system (BTS) type.

9. The filter of claim 8, wherein the combination of filter parameter values minimizes inter-symbol interference.

10. The filter of claim 8, wherein the digital filter separately filters I and Q data streams.

11. The filter of claim 8, the reconfigurable digital filter having a plurality of tap coefficients, a series of tap outputs, and a series of tap output ports, each output port associated with a tap output, wherein each tap output after a first tap output in the series is determined by delaying an input signal, then multiplying the delayed input signal by a tap coefficient to obtain a result, then adding the result to the previous tap output in the series, and wherein the output port used by the filter is determined by at least one of the filter parameter values.

12. The filter of claim 8, wherein the RF transmitter comprises a wide-band code division multiple access (WCDMA) transmitter.

13. The filter of claim 8, wherein the filter parameter values are at least one of: a filter length, a word length, a sampling rate, bits per sample, a sampling bit, a tap delay, a tap coefficient and a coefficient length.

14. The filter of claim 8, wherein the combination of filter parameter values comprises a coefficient quantization.

15. For use in a wireless communication system, an RF transmitter filter, comprising:
- a waveform detector configured to detect a power level of a transmitted data stream on a symbol-by-symbol basis;
- a processor configured to select, from a lookup table coupled to the processor, a combination of filter parameter values according to the power level, the filter parameter values comprising a word length and a coefficient quantization; and
- a reconfigurable digital filter configured to filter the transmitted data stream according to the combination of filter parameter values, wherein the combination of filter parameter values minimizes the number of instructions performed by the reconfigurable digital filter and allows the filtered data stream to meet a spectrum emission mask of the RF transmitter, the spectrum emission mask identifying a maximum allowed power of spurious and noise signals in the spectrum outside an authorized transmission channel, the spectrum emission mask comprising a plurality of transmit power levels, each transmit power level corresponding to a different base transceiver system (BTS) type.

16. The filter of claim 15, wherein the combination of filter parameter values minimizes inter-symbol interference.

17. The filter of claim 15, wherein the combination of filter parameter values minimizes power consumption of the reconfigurable digital filter.

18. The filter of claim 15, the reconfigurable digital filter having a plurality of tap coefficients, a series of tap outputs, and a series of tap output ports, each output port associated with a tap output, wherein each tap output after a first tap output in the series is determined by delaying an input signal, then multiplying the delayed input signal by a tap coefficient to obtain a result, then adding the result to the previous tap output in the series, and wherein the output port used by the filter is determined by at least one of the filter parameter values.

19. The filter of claim 15, wherein the RF transmitter comprises a wide-band code division multiple access (WCDMA) transmitter.

20. The filter of claim 15, wherein the filter parameter values further comprise at least one of: a filter length, a sampling rate, bits per sample, a sampling bit, a tap coefficient and a coefficient length.

21. The filter of claim 15, wherein the combination of filter parameter values comprises a tap delay.

* * * * *